(12) United States Patent
Jagd et al.

(10) Patent No.: US 12,304,018 B2
(45) Date of Patent: May 20, 2025

(54) COUPLING UNIT FOR COUPLING A ROTATABLE THREAD ENGAGEMENT MEANS OF A BOLT ELONGATION TOOL FOR ELONGATING A BOLT OF A FLANGE CONNECTION WITH THE BOLT

(71) Applicant: ADMEDE AB, Malmö (SE)

(72) Inventors: Lars Jagd, Malmö (SE); Kenneth Johst, Frederiksberg C (DK); Gerald Marinitsch, Kalsdorf (AT)

(73) Assignee: ADMEDE AB, Malmö (SE)

( * ) Notice: Subject to any disclaimer, the term of this patent is extended or adjusted under 35 U.S.C. 154(b) by 0 days.

(21) Appl. No.: 18/855,613

(22) PCT Filed: Jun. 6, 2023

(86) PCT No.: PCT/EP2023/065130
§ 371 (c)(1),
(2) Date: Oct. 9, 2024

(87) PCT Pub. No.: WO2023/247176
PCT Pub. Date: Dec. 28, 2023

(65) Prior Publication Data
US 2025/0114885 A1    Apr. 10, 2025

(30) Foreign Application Priority Data
Jun. 20, 2022   (EP) ..................................... 22179798

(51) Int. Cl.
*B23P 19/06*   (2006.01)
(52) U.S. Cl.
CPC ................... *B23P 19/067* (2013.01)

(58) Field of Classification Search
CPC .......... B23P 19/00; B23P 19/02; B23P 19/04; B23P 19/06; B23P 19/067; B23P 19/069;
(Continued)

(56) References Cited

U.S. PATENT DOCUMENTS

| 4,047,456 A | 9/1977 | Scholz |
| 2016/0271775 A1 | 9/2016 | Hohmann et al. |

(Continued)

FOREIGN PATENT DOCUMENTS

EP   3069827 A1 *  9/2016  ............ B23P 19/067

OTHER PUBLICATIONS

International Search Report and Written Opinion, mailed Sep. 19, 2023, from PCT International App. No. PCT/EP2023/065130.
(Continued)

*Primary Examiner* — Robert J Scruggs
(74) *Attorney, Agent, or Firm* — Workman Nydegger

(57) ABSTRACT

A coupling unit configured to couple a rotatable thread engagement device of a bolt elongation tool for elongating a bolt of a flange connection with the bolt, wherein the bolt elongation tool includes the thread engagement device and an expansion device connected to the thread engagement device, where the coupling unit includes a lowering unit configured to lower the thread engagement device onto the bolt and towards the flange connection, and a rotation unit configured to rotate the thread engagement device when the thread engagement device is lowered, with a rotational speed corresponding to a thread feed of the bolt.

7 Claims, 3 Drawing Sheets

(58) Field of Classification Search
CPC .......... B23P 19/10; B25B 29/02; F16B 31/00; F16B 31/043
See application file for complete search history.

(56) References Cited

U.S. PATENT DOCUMENTS

2019/0299344 A1    10/2019  Hohmann et al.
2020/0023477 A1*    1/2020  Hohmann ............... B25B 29/02
2022/0152803 A1     5/2022  Asplund

OTHER PUBLICATIONS

International Preliminary Report on Patentability, mailed Jan. 10, 2024, from PCT International App. No. PCT/EP2023/065130.

\* cited by examiner

COUPLING UNIT FOR COUPLING A ROTATABLE THREAD ENGAGEMENT MEANS OF A BOLT ELONGATION TOOL FOR ELONGATING A BOLT OF A FLANGE CONNECTION WITH THE BOLT

BACKGROUND

The present invention is related to a coupling unit for a rotatable thread engagement means of a bolt elongation tool according to the preamble of claim 1.

In the field of modern energy production, wind turbines play an essential part to provide renewable, sustainable, and clean energy for the energy market. Wind turbines comprise a tower, on which a rotor is mounted, which is connected to an electric generator. The tower can reach a height of 100 meters, 150 meters, or even more depending on the specific requirements resulting from, among others, the location of the wind turbine. The tower consists of several tube segments with a length of for instance 20 meters or 30 meters. These segments are connected by circular flange connections on each side of the tube segments. During erection of the wind turbine on site, the tube segments are fitted together and connected with the joint circular flange connections with bolts and nuts. Large quantities of bolts, typically in the hundreds, of large size are necessary to establish the required stiffness and strength of the connections. In order to achieve the appropriate defined stiffness and strength in the joints, all the bolts have to be bolted down with a predefined preload or torque, and according to a specific bolt tightening pattern.

This torquing operation has previously been performed manually, using torque wrenches or similar tools. Therefore, the construction of wind turbine towers was very labor intensive. One of the main challenges when assembling wind turbines lies in torquing the bolts of the flange connections down correctly to achieve the necessary clamping forces. The necessary torques for this application are very high and therefore these tools are expensive and prone to errors or mechanical failures. Another method to achieve the necessary clamping forces lies in elongating the bolt by applying a stretching force to the bolt, using a bolt elongation tool, and then fastening a lock nut on the bolt while the stretching force is still applied. Once this lock nut has been fastened, the stretching force is released, and the bolt returns to its original length, thereby clamping the lock nut. By employing this method, very precisely defined clamping forces can be achieved.

However, bolt elongation tools according to the prior art suffer from certain disadvantages. They comprise a thread engagement means which must be screwed onto the bolt, and which is then used to exert the stretching force on the bolt. This process of screwing on is time consuming and prone to errors. Due to the dimensions of the bolt and the weight of this thread engagement means, the thread engagement means may lock up with the thread of the bolt during this process, resulting in an imperfect or insufficient grip between these two components. When this happens, it is necessary to unscrew the thread engagement means from the bolt and restart the process. Furthermore, due to the weight of the thread engagement means and the bolt elongation tool as a whole, the first few threads of the bolt have to resist high friction forces and high loads when the thread engagement means is screwed onto the bolt. This may lead to a damage of the bolt and/or the thread engagement means.

BRIEF SUMMARY

The technical problem of the present invention is therefore to alleviate these problems of the prior art.

This problem is solved by the provision of a coupling unit according to the subject matter of claim 1 and a bolt elongation system according to the subject matter of claim 7.

The coupling unit according to the invention is configured to couple a rotatable thread engagement means of a bolt elongation tool for elongating a bolt of a flange connection with the bolt. The bolt elongation tool comprises the rotatable thread engagement means configured to be threaded onto the bolt, and an expansion device connected to the thread engagement means configured to exert a force essentially perpendicular to and away from the flange connection onto the thread engagement means, when the thread engagement means is engaged with the thread of the bolt. The coupling unit according to the invention comprises a lowering unit configured to lower the thread engagement means onto the bolt and towards the flange connection, and a rotation unit configured to rotate the thread engagement means when the thread engagement means is lowered, with a rotational speed corresponding to a thread feed of the bolt. By matching the rotational speed of the thread engagement means with the lowering speed of the lowering unit and the thread feed of the bolt, an automatic matching of the thread engagement means, and the threads of the bolt can be achieved. Hereby the friction between the thread engagement means and the threads of the bolt are reduced, and the thread engagement means easily screw onto the bolt. This reduces the possibility of damage to the thread engagement means and the bolt and reduces the risk of needing to unscrew the thread engagement means from the bolt and rescrew the thread engagement means onto the bolt in order to achieve sufficient thread engagement. The coupling unit according to the invention provides an almost weight-less thread engagement, with only a small vertical force being applied from the bolt elongation tool to the thread.

According to the preferred embodiment of the coupling unit according to the invention, the coupling unit comprises a height compensation unit configured to support the thread engagement means. The height compensation unit comprises a free play along a lowering direction of the lowering unit, and the thread engagement means is displaceable along the free play of the height compensation unit, when the thread engagement means is supported by the height compensation unit. By providing a free play along the lowering direction, the coupling unit according to the invention allows the thread engagement means of the bolt elongation tool to rotate freely for a certain period while lowering the thread engagement means onto the bolt. Hereby the thread of the bolt can match with the thread engagement means without exerting an excessive force on the uppermost thread of the bolt.

Preferably, the lowering unit comprises a linear motor. Alternatively, the lowering unit may also be realized by a mechanical arm connected to a series of gears or chain drives. Other mechanical means of realizing a lowering unit are obvious to the person skilled in the art. These options provide robust and stable means of propulsion.

The coupling unit according to the invention also preferably comprises a drive unit configured to move the bolt elongation tool along the flange connection. Hereby the bolt elongation tool can fasten all bolts of a flange connection automatically.

The coupling unit according to the invention preferably comprises a centering unit, which is configured to align a central axis of the thread engagement means with a central axis of the bolt. This prevents the thread engagement means from being cross threaded onto the bolt.

The problem of the invention is also solved by the provision of a bolt elongation system according to claim 7 comprising the coupling unit according to the invention and a bolt elongation tool for elongating a bolt of a flange connection. The bolt elongation tool comprises a thread engagement means configured to be threaded onto the bolt and an expansion device connected to the thread engagement means configured to exert a force essentially perpendicular to and away from the flange connection onto the thread engagement means, when the thread engagement means is engaged with a thread of the bolt. Hereby a complete system is provided which includes the bolt elongation tool and the coupling unit.

Preferably, the expansion device of the bolt elongation tool of the bolt elongation system according to the invention comprises a hydraulic cylinder. The hydraulic cylinder provides the advantage of providing considerable force while still maintaining small external dimensions.

According to the preferred embodiment of the bolt elongation system, the bolt elongation tool comprises a lock nut fastening device, which is configured to fasten a lock nut screwed on the bolt, while the expansion device is exerting the force onto the thread engagement means. This enables the bolt elongation tool to fasten the lock nut while the bolt is in its elongated state. Hereby a precisely defined clamping force for the flange connection can be achieved.

The height compensation unit of the bolt elongation system according to the invention may also comprise a free play measuring device configured to stop or reduce a lowering speed of the lowering unit once the thread engagement means has been displaced for a predetermined distance along the free play. By measuring the distance along the free play which has been used by the thread engagement means, it can be assured that the thread engagement means have correctly engaged the threads of the bolt. If more than the predetermined distance along the free play has been used, this means that the thread engagement means have not engaged the threads, and either the bolt elongation tool is not correctly aligned with the bolt, or the threads of the bolt or the thread engagement means are damaged.

BRIEF DESCRIPTION OF THE DRAWINGS

The bolt elongation tool and the bolt elongation system according to the invention as well as preferred and alternative embodiments will be described hereinbelow with reference to the figures.

DETAILED DESCRIPTION

Figure 1:
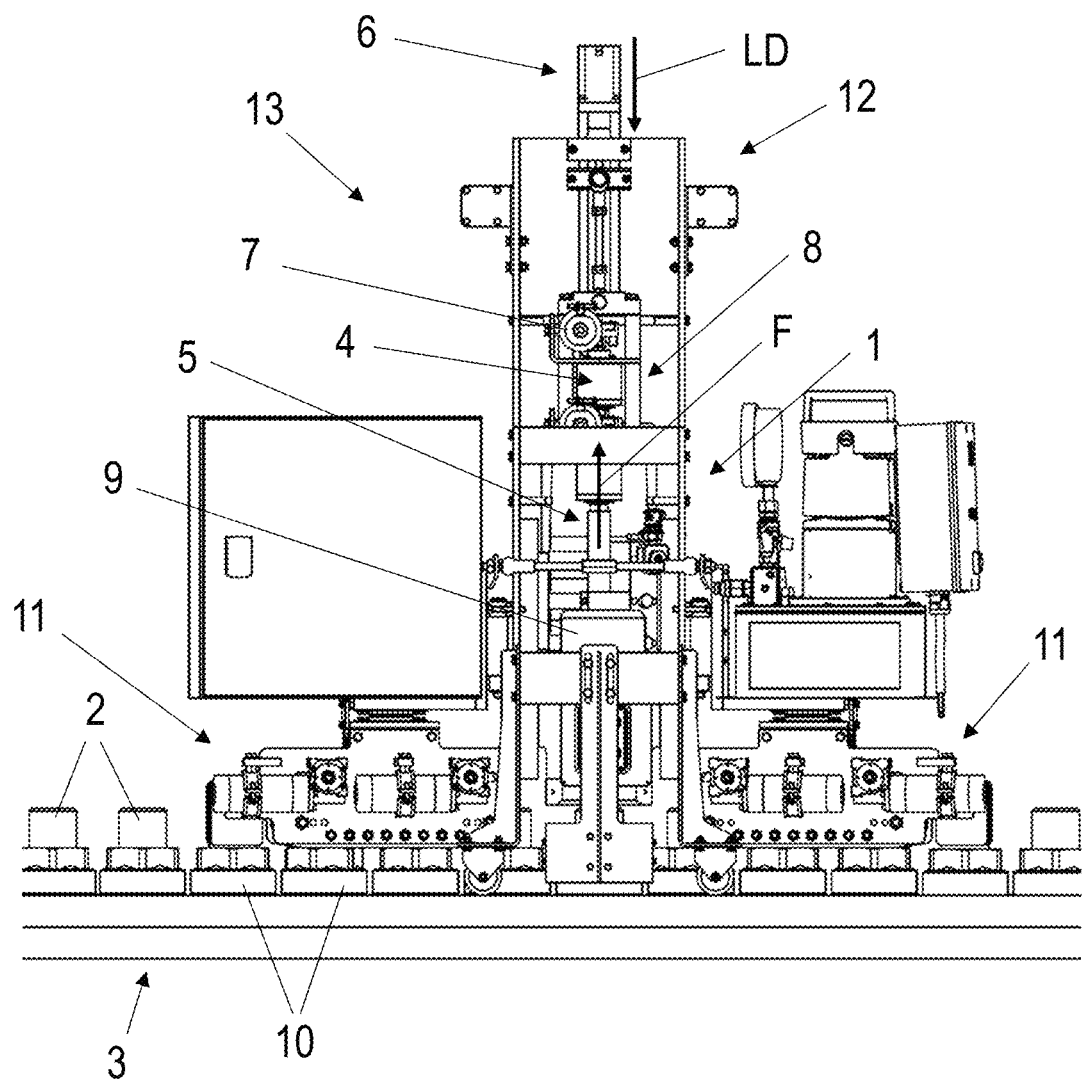
FIG. 1 shows the bolt elongation system according to the invention in a frontal view.
Figure 2:
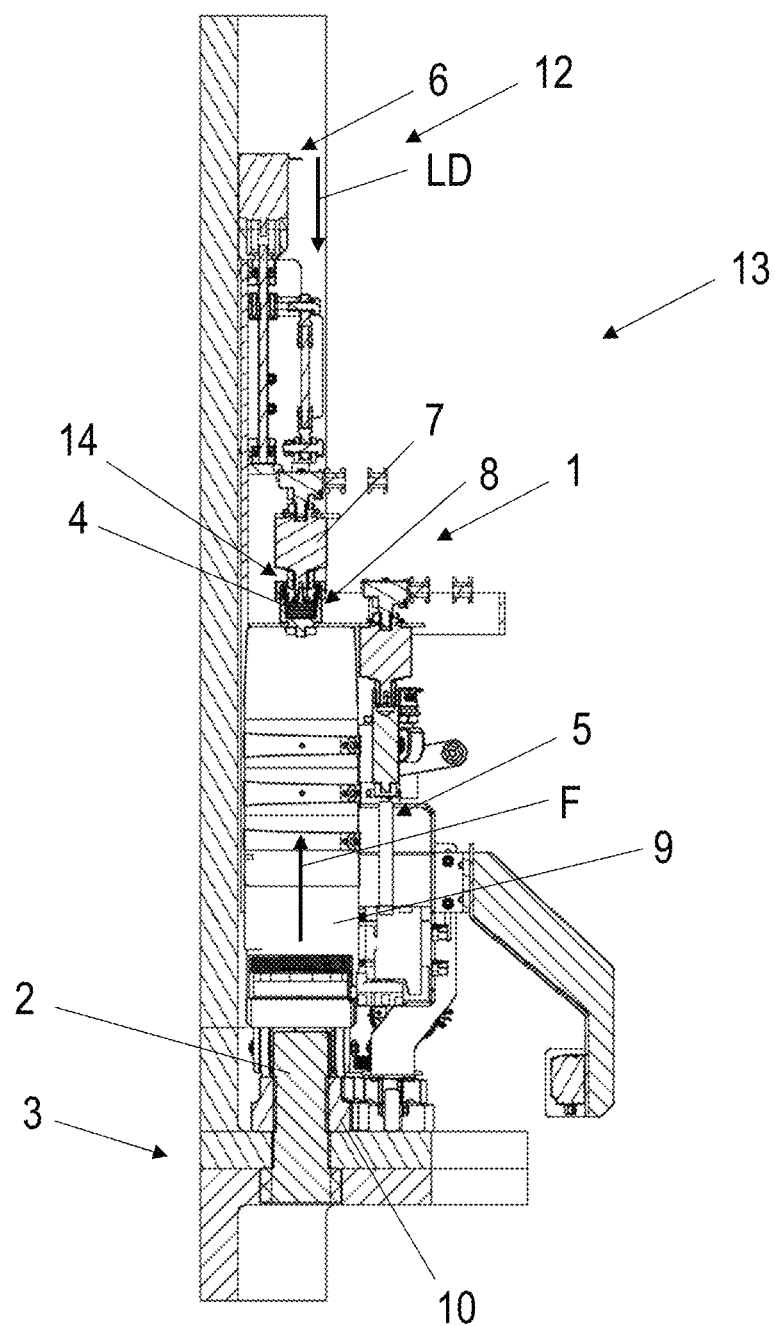
FIG. 2 shows the bolt elongation system according to the invention in a side view.

The bolt elongation system 13 according to the invention is shown in a preferred embodiment in FIG. 1. The bolt elongation system 13 comprises a bolt elongation tool 1 and a coupling unit 12 according to the invention. The bolt elongation tool 1 is configured for elongating a bolt 2 of a flange connection 3, which is also depicted in FIG. 1. The flange connection 3 is held together by a series of bolts 2, wherein on each bolt 2 a lock nut 10 is fastened in order to achieve a predefined clamping force. The bolt elongation tool 1 comprises a rotatable thread engagement means 4 configured to be threaded onto the bolt 2. The thread engagement means 4 is also shown in FIG. 2, which is a side cutaway view of the bolt elongation system 1 shown in FIG. 1. The thread engagement means 4 preferably comprises a thread, which is adapted to engage the thread of one, more or all of the bolts 2 of the flange connection 3. Furthermore, the bolt elongation tool 1 comprises an expansion device 5 connected to the thread engagement means 4 configured to exert a force F essentially perpendicular to and away from the flange connection 3 onto the thread engagement means 4, when the thread engagement means 4 is engaged with the thread of the bolt 2. The force F is shown in FIG. 1 and FIG. 2 with an arrow. Preferably, the expansion device 5 comprises a hydraulic cylinder. According to the preferred embodiment of the bolt elongation system 13, the bolt elongation tool 1 is supported on the flange connection 3 when exerting the force F on the thread engagement means 4.

The coupling unit 12 according to the invention comprises a lowering unit 6 configured to lower the thread engagement means 4 of the bolt elongation tool 1 onto the bolt 2 and towards the flange connection 3. This lowering unit 6 preferably comprises a linear motor and is preferably adapted to be arranged at a top of the bolt elongation tool 1. Alternatively, the lowering unit 6 may also be realized by a mechanical arm, preferably connected to a series of gears or chain drives. Other mechanical means of realizing the lowering unit 6 are obvious to the person skilled in the art. The coupling unit 12 is configured to lower the thread engagement means 4 of any bolt elongation tool 1 known form the prior art.

Also, the coupling unit 12 according to the invention comprises a rotation unit 7 configured to rotate the thread engagement means 4 when the thread engagement means 4 is lowered, with a rotational speed corresponding to a thread feed of the bolt 2. This rotation unit 7 may be connected directly, for example mechanically, or indirectly by means of a sensor measuring the position of the lowering unit 6 to the lowering unit 6. By rotating the thread engagement means 4 with a rotational speed corresponding to the thread feed of the bolt 2, the process of screwing on the thread engagement means 4 onto the bolt 2 is synchronized with the downward motion generated by the lowering unit 6. This results in a smooth engagement between the threads of the bolt 2 and the thread engagement means 4, reducing the friction between the threads and the force exerted on the thread engagement means 4 and the bolt 2. Hereby wear and tear on the thread engagement means 4 is reduced, and the possibility for lock ups due to increased friction when screwing on the thread engagement means 4 is reduced or even eliminated. The coupling unit 12 according to the invention may be manually operated or may also be semi-automatic or fully automatic. The rotation unit 7 may for example comprise an electric motor.

According to the preferred embodiment of the coupling unit 12 according to the invention, the coupling unit 12 comprises a height compensation unit 8 configured to support the thread engagement means 4. The height compensation unit 8 is shown in FIG. 2. The height compensation unit 8 comprises a free play along a lowering direction LD of the lowering unit 6, and the thread engagement means 4 is displaceable along the free play of the height compensation unit 8, when the thread engagement means 4 is supported by the height compensation unit 8. By providing a free play along the lowering direction LD of the lowering unit 6, the thread engagement means 4 may contact the bolt 2 on its upper end, oriented away from the flange connection 3, without being forced by the lowering unit 6 onto the thread of the bolt 2 immediately. Hereby the thread engagement means 4 can be rotated a certain degree while resting on the bolt 2, so that the threads of the bolt 2 and the threads of the thread engagement means 4 are aligned. This reduces the stress on the first thread of the bolt 2 greatly and reduces the risk of damaging the thread engagement means 4 or the bolt 2. The free play may be for example 8 mm, while usually 4 mm of this free play is used when the thread engagement means 4 are engaging the thread of the bolt 2. The height compensation unit 8 may also comprise a free play measuring device 14, which is shown in FIG. 2, configured to stop or reduce a lowering speed of the lowering unit 6 once the thread engagement means 4 has been displaced for a predetermined distance along the free play. By measuring the distance along the free play which has been used by the thread engagement means 4, it can be assured that the thread engagement means 4 have correctly engaged the threads of the bolt 2. If more than the predetermined distance along the free play has been used, this means that the thread engagement means 4 have not engaged the threads, and either the bolt elongation tool 1 is not correctly aligned with the bolt 2, or the threads of the bolt 2 or the thread engagement means 4 are damaged.

Figure 3:
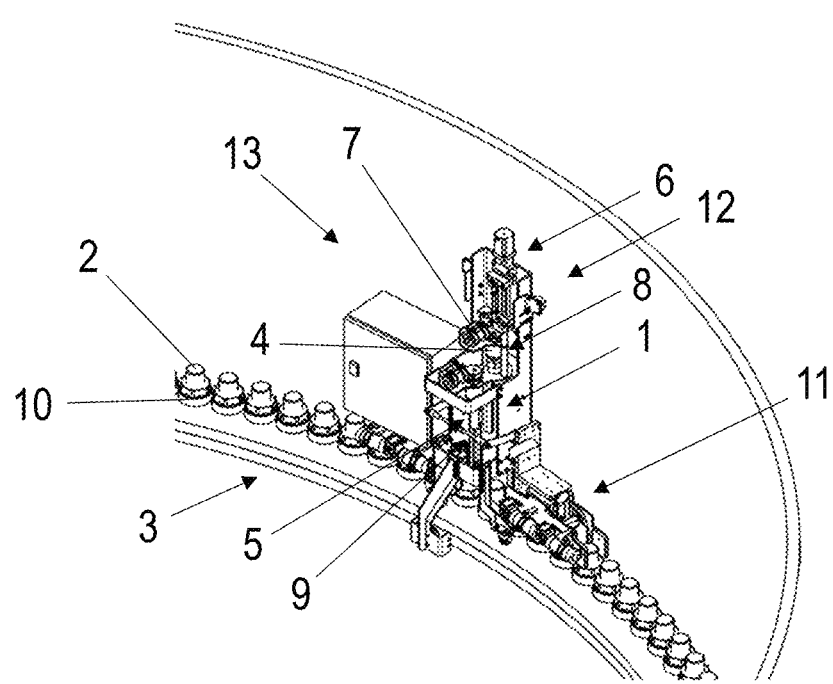
FIG. 3 shows the bolt elongation system according to the invention in a perspective view.

As can be seen in FIG. 1 and FIG. 3, the coupling unit 12 according to the invention preferably also comprises a drive unit 11 configured to move the bolt elongation tool 1 along the flange connection 3. The preferred embodiment of the coupling unit 12 depicted in the figures comprises two drive units 11. The drive unit 11 may for example include a chain drive or a wheel drive. Other means of propulsion applicable to the drive unit 11 are generally known to the person skilled in the art. The drive unit 11 enables the coupling unit 12 according to the invention to operate autonomously and automatically place the bolt elongation tool 1 above the bolts 2 to fasten a series of lock nuts 10 of the flange connection 3.

Preferably, the coupling unit 12 also comprises a centering unit, which is not shown in the figures, and which is configured to align a central axis of the thread engagement means 4 with a central axis of the bolt 2. Hereby the advantage is achieved, that cross threading of the thread engagement means 4 and the thread of the bolt 2 is avoided.

The bolt elongation system 13 according to the invention comprises the coupling unit 12 according to the invention and a bolt elongation tool 1 for elongating a bolt 2 of a flange connection 3. The bolt elongation tool 1 comprises the thread engagement means 4 configured to be threaded onto the bolt 2 and the expansion device 5 connected to the thread engagement means 4 configured to exert the force F essentially perpendicular to and away from the flange connection 3 onto the thread engagement means 4, when the thread engagement means 4 is engaged with a thread of the bolt 2. Preferably, the expansion device 5 comprises a hydraulic cylinder. Also, the bolt elongation tool 1 may preferably comprise a lock nut fastening device 9, which is shown in FIG. 1 and is configured to fasten a lock nut 10 screwed on the bolt, while the expansion device 5 is exerting the force F onto the thread engagement means 4. Hereby, the bolt elongation tool 1 according to the invention can be used to simultaneously elongate the bolt 2 and fixate the bolt 2 with the lock nut 10.

According to a preferred embodiment of the bolt elongation system 13 according to the invention, the coupling unit 12 comprises the height compensation unit 8 as described hereinabove, wherein the height compensation unit 8 comprises the free play measuring device 14 configured to stop or reduce the lowering speed of the lowering unit 6 once the thread engagement means 4 has been displaced for a predetermined distance along the free play.

The invention claimed is:

1. A coupling unit configured to couple a rotatable thread engagement means of a bolt elongation tool configured to elongate a bolt of a flange connection with the bolt, wherein the bolt elongation tool comprises the thread engagement means configured to be threaded onto the bolt and an expansion device connected to the thread engagement means configured to exert a force (F) essentially perpendicular to and away from the flange connection onto the thread engagement means, when the thread engagement means is engaged with a thread of the bolt, wherein the coupling unit comprises a lowering unit configured to lower the thread engagement means onto the bolt and towards the flange connection, and a rotation unit configured to rotate the thread engagement means when the thread engagement means is lowered, with a rotational speed corresponding to a thread feed of the bolt, wherein the coupling unit comprises a height compensation unit configured to support the thread engagement means, wherein the height compensation unit comprises a free play along a lowering direction (LD) of the lowering unit, and the thread engagement means is displaceable along the free play of the height compensation unit, when the thread engagement means is supported by the height compensation unit, and the height compensation unit comprises a free play measuring device configured to stop or reduce a lowering speed of the lowering unit once the thread engagement means has been displaced for a predetermined distance along the free play.

2. The coupling unit according to claim 1, wherein the lowering unit comprises a linear motor.

3. The coupling unit according to claim 1, wherein the coupling unit comprises a drive unit configured to move the bolt elongation tool along the flange connection.

4. The coupling unit according to claim 1, wherein the coupling unit comprises a centering unit, which is configured to align a central axis of the thread engagement means with a central axis of the bolt.

5. A bolt elongation system comprising a coupling unit according to claim 1 and a bolt elongation tool configured to elongate a bolt of a flange connection, wherein the bolt elongation tool comprises a thread engagement means configured to be threaded onto the bolt and an expansion device connected to the thread engagement means configured to exert a force (F) essentially perpendicular to and away from the flange connection onto the thread engagement means, when the thread engagement means is engaged with a thread of the bolt.

6. The bolt elongation system according to claim 5, wherein the expansion device of the bolt elongation tool comprises a hydraulic cylinder.

7. The bolt elongation system according to claim 5, wherein the bolt elongation tool comprises a lock nut fastening device, which is configured to fasten a lock nut screwed on the bolt, while the expansion device is exerting the force (F) onto the thread engagement means.

* * * * *